United States Patent
Lin et al.

(10) Patent No.: US 9,796,444 B1
(45) Date of Patent: Oct. 24, 2017

(54) FOLDABLE STRUCTURE OF ELECTRIC VEHICLE

(71) Applicants: Global WIN Technology Co., Ltd., Taipei (TW); Kuan Yu Lin, Taipei (TW)

(72) Inventors: Shih-Jen Lin, Taipei (TW); Kuan Yu Lin, Taipei (TW)

(73) Assignees: Global Win Technology Co., Ltd., Taipai (TW); Kuan Yu Lin, Taipei (TW)

( * ) Notice: Subject to any disclaimer, the term of this patent is extended or adjusted under 35 U.S.C. 154(b) by 0 days.

(21) Appl. No.: 15/363,721

(22) Filed: Nov. 29, 2016

(51) Int. Cl.
| | |
|---|---|
| *B62K 15/00* | (2006.01) |
| *B62K 11/00* | (2006.01) |
| *B62J 25/00* | (2006.01) |
| *B62J 1/00* | (2006.01) |
| *A63C 17/00* | (2006.01) |
| *B62M 7/12* | (2006.01) |

(52) U.S. Cl.
CPC ........ *B62K 15/006* (2013.01); *A63C 17/0093* (2013.01); *B62J 1/00* (2013.01); *B62J 25/00* (2013.01); *B62K 11/007* (2016.11); *B62K 15/00* (2013.01); *B62K 15/008* (2013.01); *B62M 7/12* (2013.01); *B60Y 2200/91* (2013.01)

(58) Field of Classification Search
CPC .. A63C 17/0093; B62K 15/00; B62K 15/008; B62M 7/12
See application file for complete search history.

(56) References Cited

U.S. PATENT DOCUMENTS

| 8,467,922 B2 * | 6/2013 | Takenaka ............... B60L 15/20 180/205.1 |
|---|---|---|
| D729,698 S * | 5/2015 | Chen ........................... D12/107 |
| 9,481,423 B2 * | 11/2016 | Chen ......................... B62K 1/00 |
| 9,611,004 B2 * | 4/2017 | Hoffmann ............... B62M 7/12 |
| 2006/0279057 A1 * | 12/2006 | Shimizu .................... B62K 1/00 280/205 |
| 2009/0266629 A1 * | 10/2009 | Simeray .................. B62K 1/00 180/65.51 |
| 2010/0114468 A1 * | 5/2010 | Field ...................... B60N 2/045 701/124 |

(Continued)

FOREIGN PATENT DOCUMENTS

| DE | 102010027997 A1 * | 3/2011 | ............. B62K 3/002 |
|---|---|---|---|
| NZ | WO 2017043978 A1 * | 3/2017 | ............. B62M 6/40 |

*Primary Examiner* — Nicole Verley
(74) *Attorney, Agent, or Firm* — Muncy, Geissler, Olds & Lowe, P.C.

(57) ABSTRACT

A foldable structure of an electric vehicle is disclosed. In the foldable structure, a frame defines a stowing space, and includes a connection base and a rotatable seat. The connection base has a chute and the seat includes a link rod. The wheel part includes two wheel casings, a tire and a driving device, and a containing space is formed between the wheel casings for containing the tire and the driving device. The wheel casings has a rotator cap protruded at tops thereof, and the rotator cap has an axle hole longitudinally cut therethrough, and the rotator cap is pivotally connected with the rotatable seat by the axle hole, whereby the link rod can be slid into the chute, and the two wheel casings and the tire can be laterally rotated into the stowing space, such that the electric vehicle can just occupy smaller space.

6 Claims, 7 Drawing Sheets

(56) References Cited

U.S. PATENT DOCUMENTS

| | | | |
|---|---|---|---|
| 2011/0056757 A1* | 3/2011 | Polutnik | B62K 1/00 |
| | | | 180/65.51 |
| 2011/0068738 A1* | 3/2011 | Gomi | B62J 1/005 |
| | | | 320/108 |
| 2011/0220427 A1* | 9/2011 | Chen | B62K 1/00 |
| | | | 180/21 |
| 2012/0175175 A1* | 7/2012 | Gomi | B62J 1/005 |
| | | | 180/21 |
| 2012/0175176 A1* | 7/2012 | Hamaya | B62J 1/005 |
| | | | 180/21 |
| 2012/0217072 A1* | 8/2012 | Hoffmann | B60T 7/042 |
| | | | 180/21 |
| 2013/0048401 A1* | 2/2013 | Kim | B62K 15/00 |
| | | | 180/220 |
| 2014/0058600 A1* | 2/2014 | Hoffmann | B62K 1/00 |
| | | | 701/22 |
| 2015/0035250 A1* | 2/2015 | Jayasuriya | B62H 3/12 |
| | | | 280/287 |
| 2015/0321722 A1* | 11/2015 | Dadoosh | B62K 3/002 |
| | | | 180/208 |
| 2016/0339328 A1* | 11/2016 | Simeray | A63C 17/0093 |

\* cited by examiner

FOLDABLE STRUCTURE OF ELECTRIC VEHICLE

BACKGROUND OF THE INVENTION

1. Field of the Invention

The present disclosure relates to a foldable structure of an electric vehicle, more particularly to the foldable structure in which a link rod of a seat can be slid into a frame, and a wheel part can be laterally rotated into a stowing space in the circular-band-shaped frame by a rotator cap, and a step is rotated into a receiving groove, whereby the electric vehicle can have a reduced size and occupies smaller space, to facilitate receiving and carrying of the electric vehicle.

2. Description of the Related Art

With the progress of the times and social change, cities become more and have increasingly large ranges. Most of the people living in these cities usually drive vehicles, which results in a lot of air pollution problems and traffic problems, such as road congestion and traffic accident. Hence, the government also encourages people to frequently use public transport vehicles, so as to solve traffic jam; however, after leaving a station of public transport vehicle, person must move (such as walk) a distance to reach destination. Therefore, convenient portable personal vehicles are imperatively required by the people who use the public transport vehicles.

There are many commercially-available electric vehicles which most are electric bikes or electric motorcycles. The conventional electric bikes or electric motorcycles are designed by just replacing original power systems by electrical power systems, so they have disadvantages of large size, inconvenience in carrying and receiving. Therefore, a manufacturer develops a self-balancing electric scooter for standing user. Please refer to FIGS. 6 and 7. A motor A2 is mounted on a frame A1 disposed inside a casing A, and directly drives a drive wheel A21 coupled to the frame A1 and positioned at the lowermost point along the inner rim of a wheel B. A guide wheel A22 and the drive wheel A21 are in contact with the inner rim of the wheel B, and the drive wheel A21 has a wide roller with a groove in the center into which rib B1 fits. By way of its contact with the wheel B, the drive wheel A21 transmits torque from the motor A2 to the wheel B. Since this drive system operates by friction, the drive wheel A21 and the inner rim of the wheel B must be pressed together with enough force to prevent slippage.

A casing A encloses a part or most of the devices. The user stands with one foot on each platform C and faces toward the direction of travel of the wheel B. A gyroscope system is associated with the motor A2 and configured to sense forward and backward tilt of the frame A1 in relation to the ground and regulates the motor A2 accordingly to keep the frame A1 upright. This provides a means for controlling the acceleration and deceleration of the vehicle by leaning forward or backward, and also enables the vehicle to self-regulate its balance in the fore-and-aft plane.

While the vehicle is in use, the user must hold the casing A by legs, and only stands on the platform C by feet, so it is difficult for the user to maintain an upright posture and hold center of gravity, and further control direction of movement. As a result, it is difficult for the user to get started, and the user easily feels tired because of keeping applying force by feet in use.

A personal mobility vehicle provided with an electric gyroscope to accelerate or decelerate wheel, to achieve function of maintaining balance in the fore-aft plane. The personal mobility vehicle is also provided with a sensing device and the electric gyroscope which are configured to detect and transmit position information of the vehicle to a motor, such that the motor can drive the wheel to roll in enough speed and proper direction to enable the vehicle to self-regulate its balance in the fore-and-aft plane.

Furthermore, this prior art design discloses embodiments with two wheels and single wheel respectively. The personal mobility vehicle is provide with a platform for the user to stand, but the user's ankle cannot be in contact with the vehicle, so it is difficult for the user to accurately control balance and direction by feet. As a result, the user feels unsafe and uncomfortable while driving the vehicle to turn left or right, travel on ascent, downhill, or road bumps. Handlebars are for convenient control; however, the embodiment with handlebars has a large volume and is inconvenient for the user to stow or carry.

Other prior art which discloses a motorized transport vehicle includes two guide supports to form a structure in a cross-bar or handcuff shape to tightly hold the user's knee or lower leg, to limit a range of forward or backward tilt of the user's knee or lower leg, such that the user can ride the vehicle more stably and step footrests to drive and lean the single-wheel vehicle. However, the structure of holding the user's leg to limit the range of forward or backward tilt will also interfere the user to escape from the guide supports of the single-wheel vehicle when the user encounters danger in driving the vehicle; obviously, the single-wheel vehicle disclosed in this prior art is inconvenient and unsafe. In addition, the height of leg held of two guide supports is not high enough, so it is not easy for the user to control the direction of movement; furthermore, the user may feel tired after standing for a long time, that is, only young people or skilled users would like to drive the single-wheel vehicles. As a result, the single-wheel vehicle still has disadvantages of inconvenience and uncomfortability.

Therefore, what is need is to develop an electric vehicle which is easy to carry and stow, and has sufficient convenience, safety and comfortability.

SUMMARY OF THE INVENTION

In order to solve aforementioned problem, the inventor of the present disclosure puts years of practical experience into research and design and finally succeeded in a foldable structure of an electric vehicle.

A primary objective of the present disclosure is that, when the electric vehicle is to be stowed, a link rod of a seat is slid into a chute of a connection base of a frame, a step is rotated into a receiving groove by a pivoting part, and two wheel casings are laterally rotated about a rotatable seat of the frame into a stowing space of the frame by an axle hole of a rotator cap, whereby the folded electric vehicle has a reduced size and just occupies a smaller space, to facilitate receiving and carrying of the electric vehicle.

A secondary objective of the present disclosure is that, while the electric vehicle is in use, the user sits on the seat, so the user will not feel toilsome or uncomfortable after long-time use; furthermore, the user can hold the seat by buttock and upper leg, so it is easier and more convenient for the user to apply force on the electric vehicle for controlling a direction of movement; in addition, the user places feet on the two steps, so the user can relax feet without keeping rising feet; furthermore, the user's feet can assist balance. As a result, the electric vehicle of present disclosure is able to improve comfortability, stability and safety in use.

Other objective of the present disclosure is that a rear lamp is disposed on the connection base of the frame, and a front lamp is disposed on the front part of the frame, so these two lamps can emit light to illuminate front and rear roads for the user to view clearly, and remind person or vehicle in the front or rear of the electric vehicle, thereby achieving purpose of improving safety.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become apparent by the detailed description of the following embodiments and the illustration of related drawings as follows.

Figure 1:
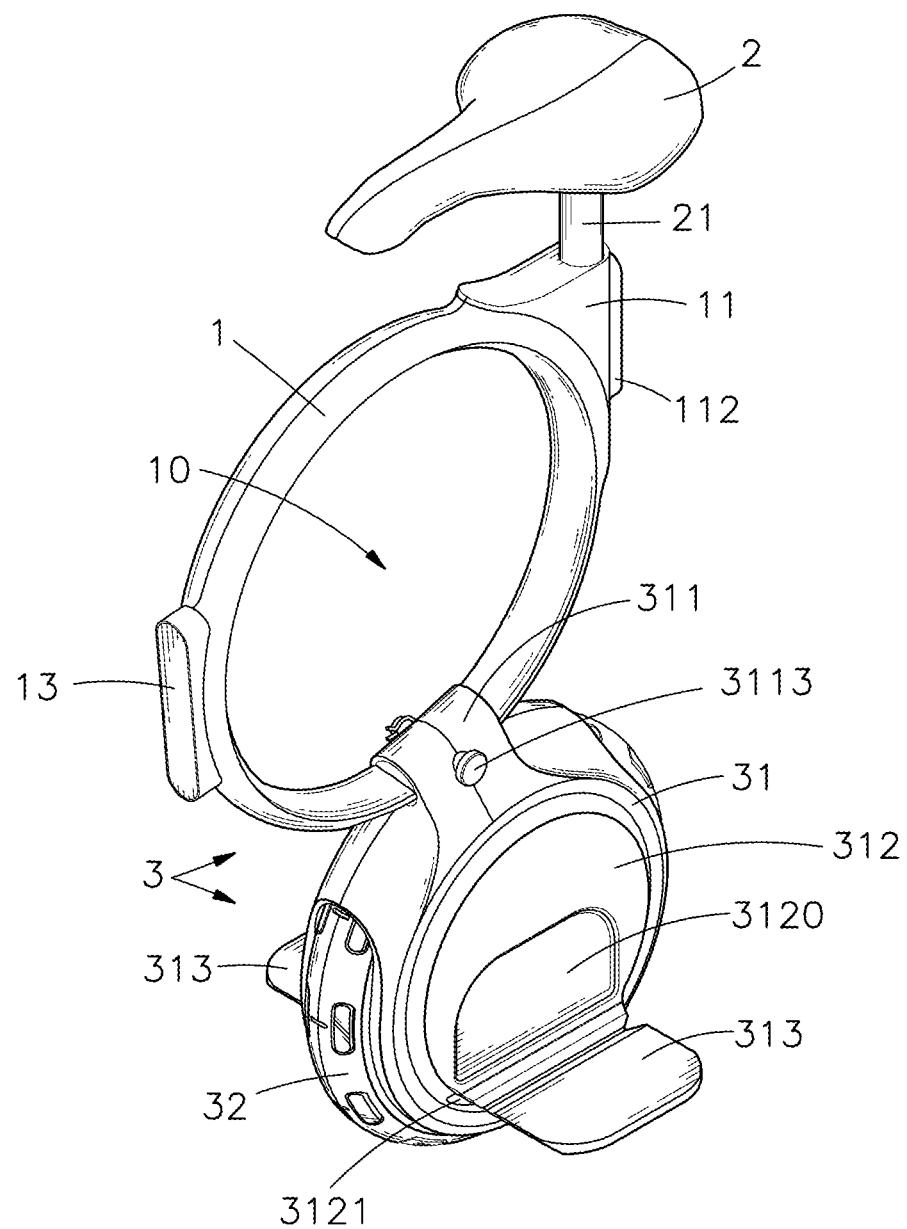
FIG. 1 is an elevational view of a foldable structure of the present disclosure.
Figure 2:
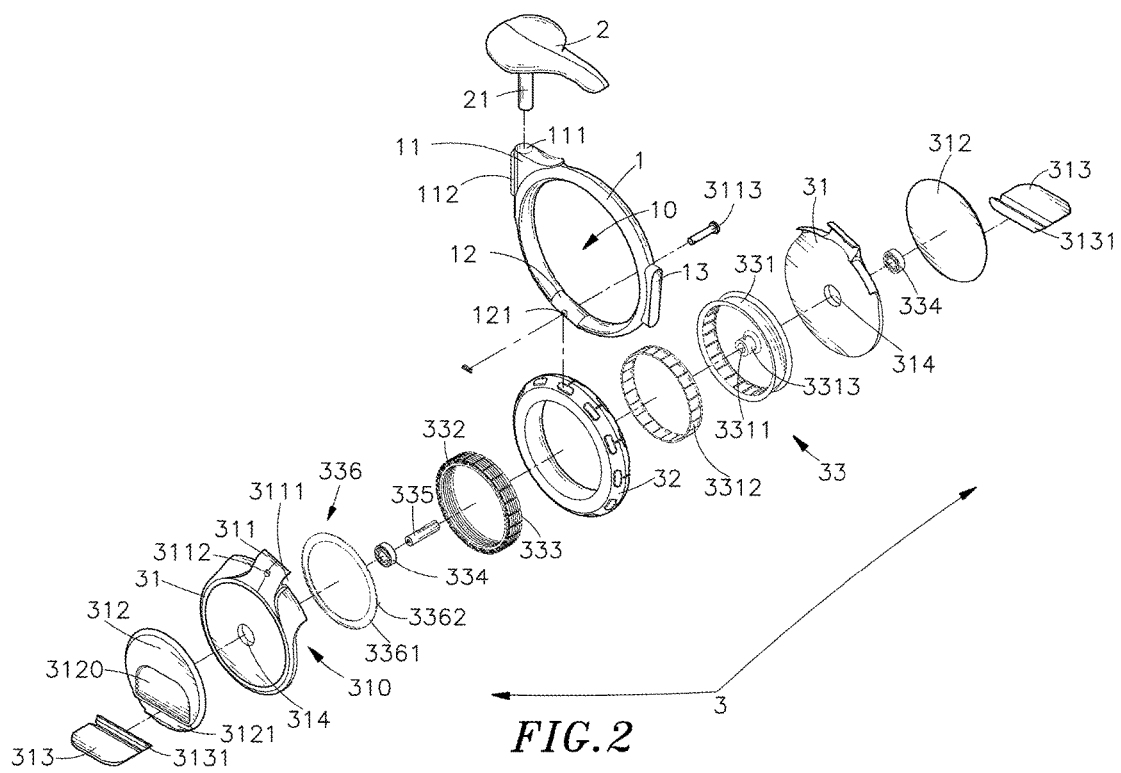
FIG. 2 is a perspective exploded view of the foldable structure of the present disclosure.
Figure 3:
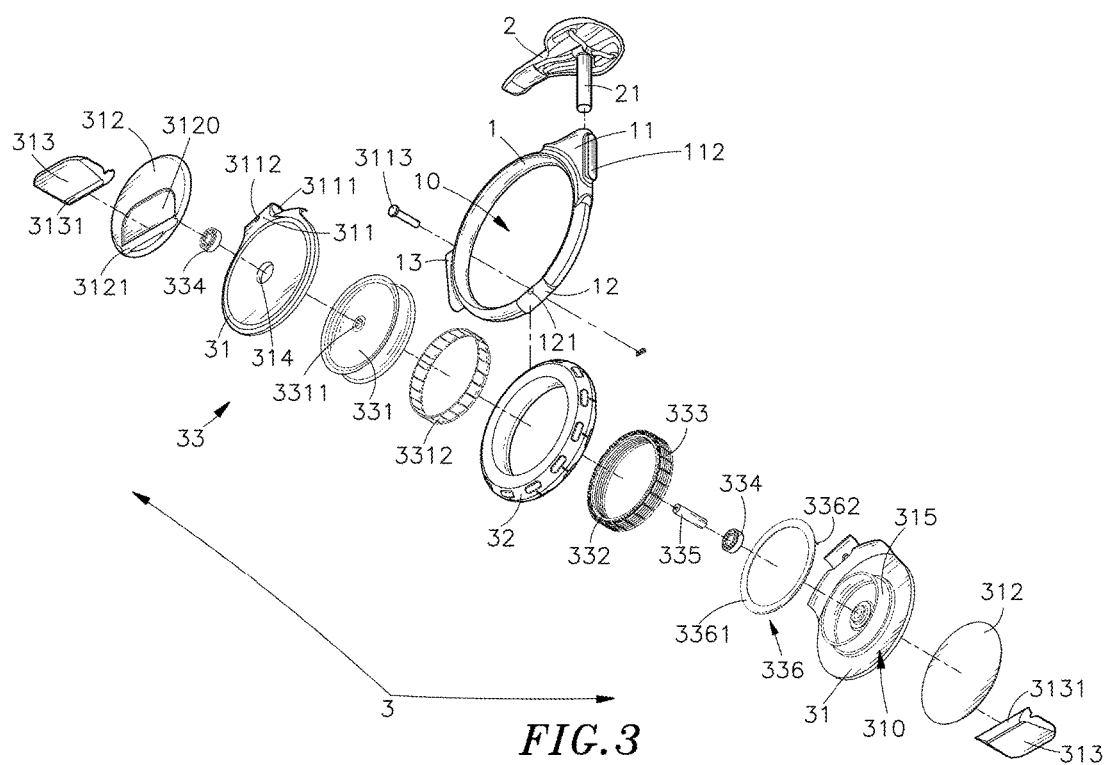
FIG. 3 is another perspective exploded view of the foldable structure of the present disclosure.
Figure 4:
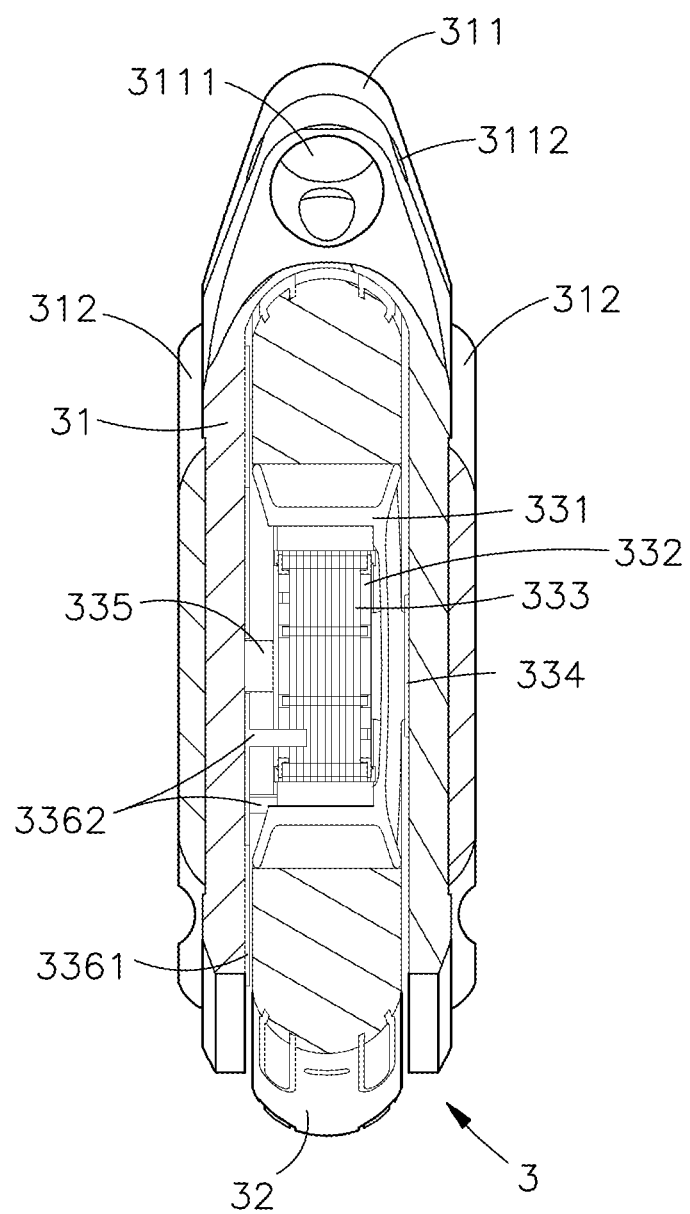
FIG. 4 is a sectional side view of the foldable structure of the present disclosure.
Figure 5:
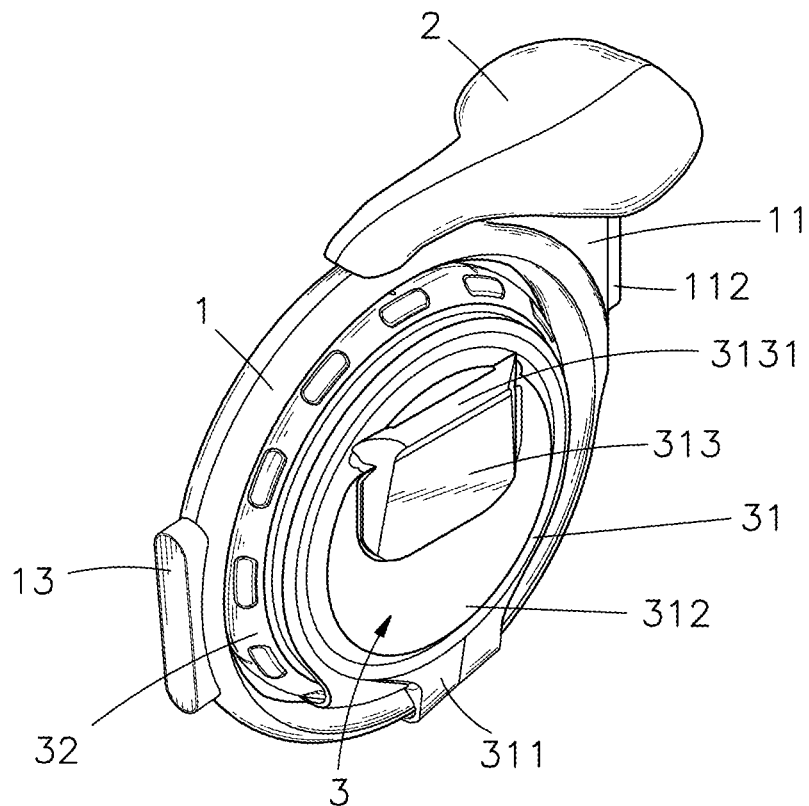
FIG. 5 is an elevational view of the foldable structure in a stowed state, in accordance with the present disclosure.
Figure 6:
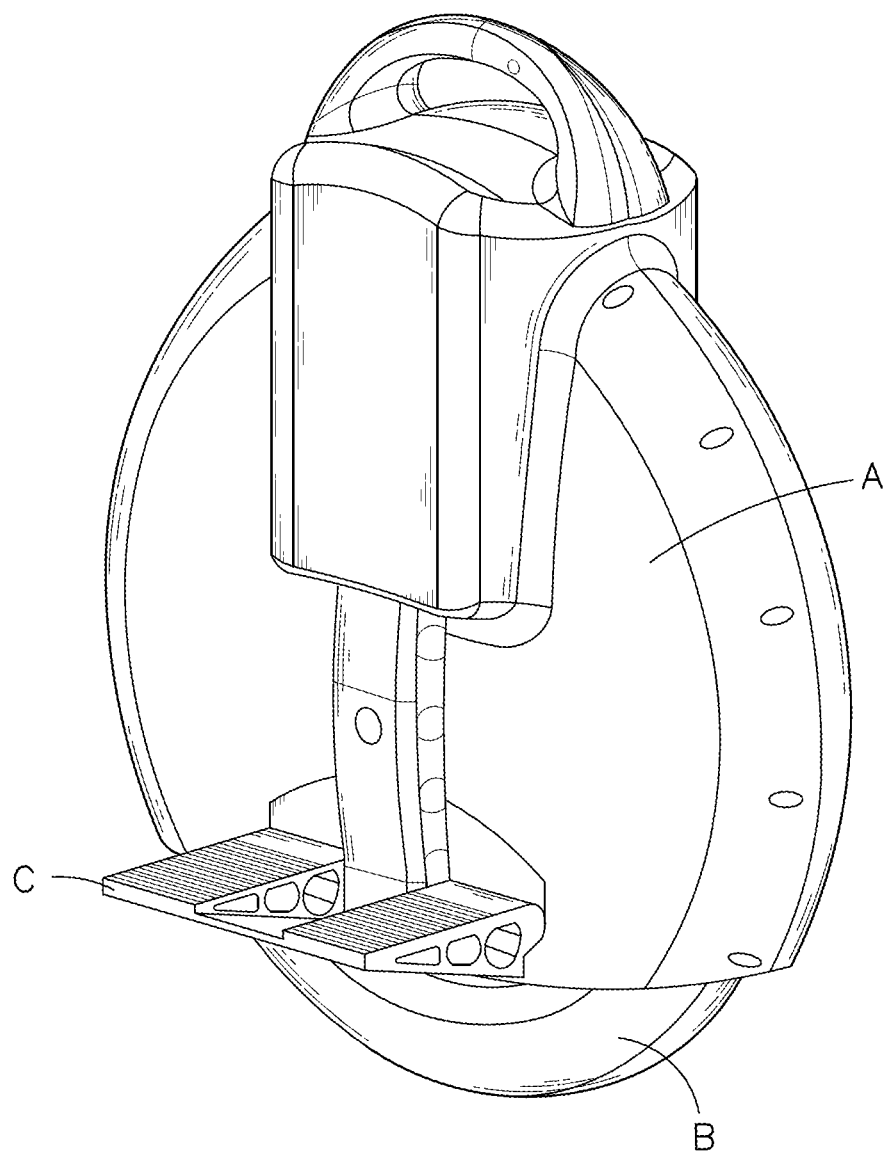
FIG. 6 is an elevational view of a conventional electric vehicle according to the prior art.
Figure 7:
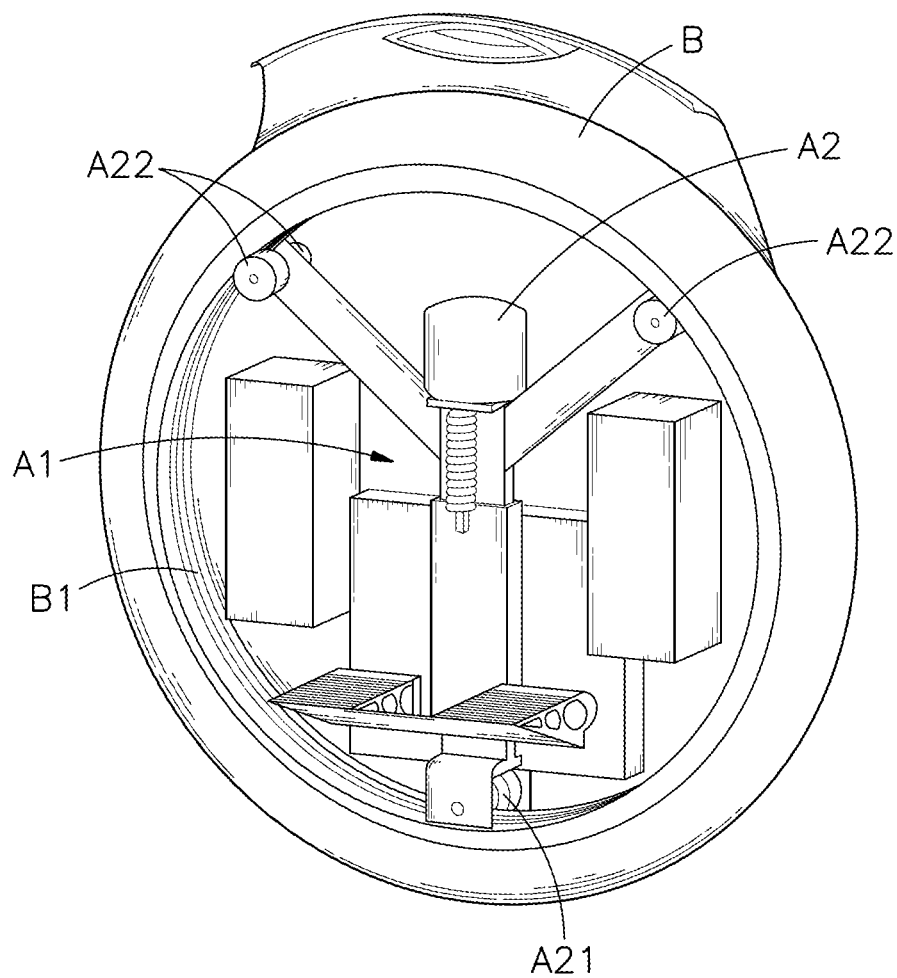
FIG. 7 is a perspective view of the conventional electric vehicle according to the prior art.

Please refer to FIGS. 1 through 5 which show a foldable structure of an electric vehicle of present disclosure. The foldable structure includes a frame 1, a seat 2 and a wheel part 3.

The frame 1 is in a circular band shape, defines a stowing space 10, and has a connection base 11 disposed at a top of the rear side thereof. The connection base 11 has a chute 111 recessed at top of a rear side thereof and extended downwardly, and a rear lamp 112 disposed at the rear side thereof. The frame 1 has a rotatable seat 12 disposed at a bottom thereof and in a cylinder shape, and a front lamp 13 disposed at a front side thereof. The rotatable seat 12 has a positioning hole 121 laterally cut therethrough.

The seat 2 has a link rod 21 configured to movably inserted into the chute 111. The link rod 21 can be longitudinally moved along the chute 111 for adjustment.

The wheel part 3 includes two wheel casings 31, a tire 32 and a driving device 33. A containing space 310 is formed between the two wheel casings 31 and in communication with the outside. The tire 32 and the driving device 33 are mounted in the containing space 310. The two wheel casings 31 have a rotator cap 311 protruded on tops thereof. The rotator cap 311 is formed with an axle hole 3111, and the rotatable seat 12 is pivotally sleeved with the rotator cap 311 through the axle hole 3111, such that the two wheel casings 31 and the tire 32 can be laterally rotated from the bottom of the frame 1 into the stowing space 10 to be stowed therein. Furthermore, the rotator cap 311 is formed with a through hole 3112 laterally cut therethrough and aligned with the axle hole 3111. A positioning pin 3113 is inserted through the through hole 3112 and the positioning hole 121 to position the frame 1 and the two wheel casings 31. Each of two side panels 312 disposed at left and right sides of the two wheel casings 31 has a receiving groove 3120 recessed on a surface thereof, and a pivot holder 3121 is disposed at a lower side of the receiving groove 3120. Each of two side panels 312 is connected to a step 313 disposed perpendicularly thereto, and the step 313 has a pivoting part 3131 disposed at a side thereof and configured to pivotally connect with the pivot holder 3121, such that the step 313 can be upwardly rotated to be received in the receiving groove 3120. The tire 32 is disposed in the containing space 310 formed between the two wheel casings 31, and protruded out of the bottom of the containing space 310.

While the electric vehicle is in use, the seat 2 is pulled out at a predetermined position by means of sliding the link rod 21 along the chute 111 of the connection base 11 of the frame 1. When the positioning pin 3113 is moved out of the through hole 3112, the two wheel casings 31 can be laterally rotated to the bottom of the rotatable seat 12 of the frame 1 through the axle hole 3111 of the rotator cap 311, such that the two wheel casings 31, the tire 32 and the frame 1 are aligned longitudinal in straight line arrangement, and the positioning pin 3113 can be inserted into the through hole 3112 of the rotator cap 311 and the positioning hole 121 of the rotatable seat 12 again to position the frame 1 and the two wheel casings 31. The steps 313 are respectively rotated about the pivot holders 3121 of the two side panels 312 by the pivoting parts thereof, to be separated from the receiving groove 3120 for positioning perpendicularly to the side panels 312. In the situation, the user can sit on the seat 2 and place feet on the steps 313 respectively. The tire 32 of the electric vehicle is driven by the driving device 33 to enable the forward or backward movement of the user and the electric vehicle.

When the user wants to stow the electric vehicle, the link rod 21 of the seat 2 is slid into the chute 111 of the connection base 11 of the frame 1, to position the seat 2 close to the tops of the frame 1 and the connection base 11. The steps 313 are respectively rotated about the pivot holders 3121 of the two side panels 312 by the pivoting parts 3131 thereof, such that the steps 313 are respectively received into the receiving grooves 3120. Next, the positioning pin 3113 is separated from the through hole 3112, and the two wheel casings 31 are laterally rotated about the rotatable seat 12 of the frame 1 through the axle hole 3111 of the rotator cap 311, into the stowing space 10 of the frame 1. The positioning pin 3113 is then inserted into the through holes 3112 of the rotator cap 311 and the positioning hole 121 of the rotatable seat 12, so as to position the frame 1 and the two wheel casings 31. The two wheel casings 31 of the wheel part 3 and the tire 32 are positioned in the stowing space 10 of the frame 1, the link rod 21 are received in the connection base 11, and the seat 2 are positioned close to the frame 1 and the connection base 11, so the electric vehicle in stowed state just occupies a reduced size of space, and it is convenient for the user to stow or carry.

While the electric vehicle is in use, the user sits on the seat 2, so the user will not feel toilsome or uncomfortable after long-time use; furthermore, the user can hold the seat 2 by buttock and upper leg, so it is easier and more convenient for the user to apply force on the electric vehicle for control of forward, backward, leftward or rightward movement. The user places feet on the two steps 313, so the user can relax feet without keeping rising feet; furthermore, the user's feet can assist balance. In summary, the electric vehicle of present disclosure is able to improve comfortability, stability and safety in use.

The rear lamp 112 is disposed on the connection base 11 of frame 1, and the front lamp 13 is disposed on the front part of the frame 1, so under a condition that it is dark or at night, the rear lamp 112 and the front lamp 13 can emit light to illuminate front and rear roads for the user to view clearly, and remind person or vehicle in the front or rear of the electric vehicle, so as to achieve purpose of improving safety.

The connection base 11 of the frame 1 and the link rod 21 of the seat 2 can have insertion holes corresponding in position to each other, and the pin can be inserted into the insertion holes for positioning; alternatively, the connection base 11 or the link rod 21 can be provided with a tensioner to tightly press the link rod 21 for positioning. However, the positioning structure of the connection base 11 and the link rod 21 are conventional technology, and detail of the positioning structure is not key feature of present claim, so its detailed description is omitted.

Preferably, the rear lamp 112 and the front lamp 13 of the frame 1 includes a battery, a circuit board and a plurality of light-emitting diodes, to achieve effect of emitting light; alternatively, the rear lamp 112 and the front lamp 13 of the frame 1 can include a solar cell, a bulb, or a power bank in switch or direct connection with the driving device 33. However, details of the rear lamp 112 and the front lamp 13 are conventional technology and are not key feature of present disclosure, so their detailed descriptions are omitted.

The two wheel casings 31 of the wheel part 3 have a center pipe 315 formed at centers thereof, and a stator 333 of the driving device 33 is mounted in the center pipe 315. Multiple circular silicon-steel sheet terminal heads 332 are annularly mounted on an external side of the center pipe in multilayer arrangement, and multi-stage coils are respectively wrapped on the silicon-steel sheet terminal heads 332 to form the torque stator 333 with large torque. Multiple permanent magnets 3312 are annularly mounted in a turning wheel 331. Each of the two wheel casings 31 has a receiving space 314 recessed at a center part thereof, and bearings 334 are respectively disposed in the two receiving spaces 314. The turning wheel 331 includes a bushing 3313 protruded at a center part thereof, and the bushing 3313 has a central hole 3311. A rotating shaft 335 is inserted through the central hole 3311 of the bushing 3313 of the turning wheel 331, and has two ends respectively fixed in inner rings of the two bearings 334. While the rotating shaft 335 is driven, the turning wheel 331 is simultaneously rotated to drive forward or backward rotation of the tire 32, such that the electric vehicle can move forwardly or backwardly. A circuit board 3361 of a controlling device 336 is disposed between the stator 333 and one of the two wheel casings 31. The circuit board 3361 is provided with at least one Hall detection element 3362 which is disposed close to the multi-polar permanent magnets 3312 and configured to detect the magnetic north pole or south pole of the multi-polar permanent magnets 3312 in the turning wheel 331, so as to trigger the controlling device 336 to control the multi-stage coils for driving forward or backward rotation or balance of the turning wheel 331. Furthermore, a gyroscope system and a battery (not shown in FIGs) are also disposed in the containing space 310. The gyroscope system is configured to detect a tilt situation of the electric vehicle to output signal to the controlling device; and the battery is configured to provide electrical power to the controlling device 336 for controlling the driving device 33, so as to keep balance of the frame 1.

The structure and circuit of the driving device 33 contained in the containing space 310 of the wheel part 3 can be implemented by various designs, and the driving device 33 is just used to drive rotation of the tire 32 for forward or backward movement of the electric vehicle. Hence, the present disclosure is not limited to the examples of the driving device 33 described in aforementioned embodiments. Various equivalent changes, alternations or modifications in the driving device based on description of present disclosure are all consequently viewed as being embraced by the scope of the present disclosure.

The present disclosure mainly directs to the foldable structure of the electric vehicle. The foldable structure includes a frame, a seat and a wheel part, the frame includes a connection base disposed at the top of the rear side thereof, and the cylinder-shaped rotatable seat disposed at the bottom thereof. The connection base has a chute formed at a top thereof. The seat includes a link rod disposed at a bottom thereof. The wheel part comprises the two wheel casings and a tire disposed in a containing space of the two wheel casings. The two wheel casings have a rotator cap protruded at tops thereof, and each of side panels at left and right sides of the two wheel casings has a receiving groove recessed on the surface thereof and is pivotally connected with a step. The link rod can be slid into the chute, the two wheel casings and the tire can be laterally rotated to be received in a stowing space, whereby the electric vehicle can has a reduced volume to facilitate to stow and carry the electric vehicle.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A foldable structure of an electric vehicle, comprising a frame, a seat and a wheel part, wherein:
    said frame defines a stowing space formed inside and comprises a connection base disposed on a top of a rear side thereof, said connection base has a chute recessed at a top of rear side thereof and extended downwardly, and said frame further comprises a cylinder-shaped rotatable seat disposed at a bottom thereof;
    wherein said seat comprises a link rod disposed at a bottom thereof and movably inserted into said chute for longitudinally-slidable adjustment;
    wherein said wheel part comprises two wheel casings, a tire and a driving device, a containing space is formed between said two wheel casings and configured to contain said tire and said driving device, and said two wheel casings have a rotator cap protruded tops thereof and formed with an axle hole, and said rotatable seat is pivotally sleeved with said rotator cap through said axle hole, such that said wheel casings and the tire are laterally rotated from the bottom of the frame into the stowing space to be stowed therein, each of two side panels disposed at left and right sides of said two wheel casings has a receiving groove recessed on a surface thereof, and pivotally connected with a step, and said tire is disposed in said containing space of said two wheel casings and protruded out of a bottom of said containing space.

2. The foldable structure according to claim 1, wherein said frame is in a circular band shape and said connection base of said frame has a rear lamp disposed at the rear side thereof, and said frame has a front lamp disposed at a front side thereof.

3. The foldable structure according to claim 1, wherein said rotatable seat of said frame has a positioning hole laterally cut therethrough.

4. The foldable structure according to claim 1, wherein said rotator cap of said wheel part is formed with a through hole laterally cut therethrough and aligned with said axle hole, and a positioning pin is inserted through said through hole and a positioning hole to position said frame and said two wheel casings.

5. The foldable structure according to claim 1, wherein each of said side panels comprises a pivot holder disposed at a lower side of said receiving groove, and each of said steps has a pivoting part disposed at a side thereof and configured to pivotally connect with said pivot holder, such that said steps are upwardly rotated to be received in said receiving grooves, respectively.

6. The foldable structure according to claim 1, wherein said two wheel casings of said wheel part have a center pipe formed at centers thereof, and a stator of said driving device is mounted in said center pipe, and multiple circular silicon-steel sheet terminal heads are annularly mounted on an external side of said center pipe in multilayer arrangement, and multi-stage coils are respectively wrapped on said silicon-steel sheet terminal heads to form the torque stator, and multiple permanent magnets are annularly mounted in a turning wheel;

wherein each of said two wheel casings has a receiving space recessed at the center part thereof, and bearings are respectively disposed in said two receiving spaces, and a turning wheel includes a bushing protruded at a center part thereof and having a central hole, and a rotating shaft is inserted through said central hole of said bushing of said turning wheel and has two ends respectively fixed in inner rings of said two bearings;

wherein a circuit board of a controlling device is disposed between said stator and one of said two wheel casings, and said circuit board is provided with at least one Hall detection device which is disposed close to multi-polar permanent magnets and configured to detect the magnetic north pole or south pole of said multi-polar permanent magnets in said turning wheel, so as to trigger the controlling device to control the multi-stage coils for driving forward or backward rotation or balance of said turning wheel.

\* \* \* \* \*